United States Patent
Kondo et al.

(10) Patent No.: US 10,181,707 B2
(45) Date of Patent: Jan. 15, 2019

(54) ELECTROCONDUCTIVE RESIN BODY AND VEHICLE GROUNDING STRUCTURE

(71) Applicant: Yazaki Corporation, Tokyo (JP)

(72) Inventors: Hiroki Kondo, Shizuoka (JP); Satoru Yoshinaga, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/243,124

(22) Filed: Aug. 22, 2016

(65) Prior Publication Data

US 2017/0063058 A1    Mar. 2, 2017

(30) Foreign Application Priority Data

Aug. 25, 2015 (JP) ................. 2015-165481

(51) Int. Cl.
*H01B 1/22* (2006.01)
*H02G 3/02* (2006.01)
(Continued)

(52) U.S. Cl.
CPC .............. *H02G 3/02* (2013.01); *B29C 70/34* (2013.01); *B29C 70/885* (2013.01); *B60R 16/033* (2013.01); *H01B 1/22* (2013.01); *B29K 2307/04* (2013.01); *B29K 2995/0005* (2013.01); *B29L 2031/30* (2013.01); *B60Y 2410/115* (2013.01)

(58) Field of Classification Search
CPC ........ B29K 2995/0005; B29K 2307/04; B29K 2309/08; B29K 2277/10; B60Y 2410/115; B60R 16/033; B29C 70/885; B29L 2031/30; B32B 5/12; B32B 5/22; B32B 5/24; B32B 5/26; B32B 5/28; B32B 9/007; B32B 17/02; B32B 17/04; B32B 27/00; B32B 27/38; B32B 2038/0092; B32B 2255/205; B32B 2260/046; B32B 2262/0269; B32B 2262/101; B32B 2262/106; B32B 2262/12; B32B 2262/14; B32B 2307/202; B32B 2307/204; B32B 2307/206; B32B 2311/12; B32B 2363/00; B32B 2457/10; D10B 2101/06;
(Continued)

(56) References Cited

U.S. PATENT DOCUMENTS

| 2012/0251806 A1* | 10/2012 | Jeschke | H05K 9/009 428/219 |
| 2013/0234361 A1* | 9/2013 | Tsuchiya | C08J 5/042 264/257 |
| 2015/0050450 A1* | 2/2015 | Beraud | B29C 70/882 428/113 |

FOREIGN PATENT DOCUMENTS

| GB | 2522841 A * | 8/2015 | ............... B32B 5/12 |
| JP | 63-46946 A | 2/1988 | |

(Continued)

*Primary Examiner* — Camie S Thompson
(74) *Attorney, Agent, or Firm* — Kenealy Vaidya LLP (57) ABSTRACT

Provided is a electroconductive resin body formed of fiber-reinforced resin including resin and a plurality of fiber strings formed of at least one selected from carbon fiber, high-strength fiber and glass fiber, the resin impregnating between the fiber strings, wherein the fiber strings are metal-plated. In the vehicle grounding structure, while the electroconductive resin body is used as a vehicle body, the minus terminals of vehicle-mounted devices VD and of a vehicle battery B are electrically connected to locations in the electroconductive resin body that have the metal-plated fiber strings arranged therein.

6 Claims, 4 Drawing Sheets

(51) Int. Cl.
 *B29C 70/34* (2006.01)
 *B29L 31/30* (2006.01)
 *B60R 16/033* (2006.01)
 *B29C 70/88* (2006.01)
 *B29K 307/04* (2006.01)

(58) Field of Classification Search
 CPC ............ D10B 2101/12; D10B 2101/20; D10B 2331/021; H01B 1/22; H02G 3/02
 USPC .................... 428/293.7, 294.1, 295.4–296.1, 428/298.1–299.7, 367, 388, 379, 380, 428/381, 389, 411.1, 413–418
 See application file for complete search history.

(56) References Cited

FOREIGN PATENT DOCUMENTS

| | | | |
|---|---|---|---|
| JP | 3-112097 A | 5/1991 | |
| JP | 2001-287604 A | 10/2001 | |
| JP | 2002-19544 A | 1/2002 | |
| JP | 2009-184611 A | 8/2009 | |
| WO | WO 2013150223 A2 * | 10/2013 | ........... B29C 70/882 |

* cited by examiner

| TREATMENT CONDITIONS | | | ELECTROPLATING | | PLATING DEPOSITION PROPERTY | ADHESION | SURFACE ANALYSIS | MECHANICAL PROPERTY | STRUCTURAL ANALYSIS | | |
|---|---|---|---|---|---|---|---|---|---|---|---|
| | | | | | | | XPS | | RAMAN | | |
| TEMPERA-TURE °C | PRES-SURE Mpa | DURATION Min | VOLTAGE V | CURRENT A | | | $O_{1s}/C_{1s}$ | CARBON FIBER STRENGTH N/STRING | G/D RATIO | HALF BAND-WIDTH | PEAK SHIFT |
| COMPARATIVE EXAMPLE 1 | | | 2.0 | 0.40 | × | × | 0.159 | 0.2 | 0.93 | 111.5 | 1581.0 |
| EXAMPLE 1 | 100 | 15 | 60 | 2.0 | 0.57 | ○ | ○ | 0.138 | 0.2 | 0.93 | 110.3 | 1583.2 |
| EXAMPLE 2 | 130 | 15 | 60 | 2.0 | 0.65 | ○ | ○ | 0.123 | 0.2 | 0.90 | 110.7 | 1582.9 |
| EXAMPLE 3 | 150 | 15 | 60 | 2.0 | 0.60 | ○ | ○ | 0.103 | 0.2 | 0.92 | 110.5 | 1580.0 |
| EXAMPLE 4 | 200 | 15 | 60 | 2.0 | 0.52 | ○ | ○ | 0.097 | 0.2 | 0.92 | 111.7 | 1584.7 |

ELECTROCONDUCTIVE RESIN BODY AND VEHICLE GROUNDING STRUCTURE

CROSS-REFERENCE TO RELATED APPLICATION(S)

The present application claims priority to and incorporates by reference the entire contents of Japanese Patent Application No. 2015-165481 filed in Japan on Aug. 25, 2015.

BACKGROUND OF THE INVENTION

1. Field of the Invention

The present invention relates to an electroconductive resin body and a vehicle grounding structure.

2. Description of the Related Art

Conventionally, an inner vehicle-body plate has been developed that is formed by embedding a necessary circuit pattern formed of highly electroconductive resin in a base plate part formed of insulating resin. This inner plate is obtained by integrally forming an electroconductive part and insulating resin, thereby making it possible to provide a resin body including the electroconductive part (for example, Japanese Patent Application Laid-open No. 2002-19544).

In a resin body described in Japanese Patent Application Laid-open No. 2002-19544, however, a thermoplastic resin or a thermosetting resin is used for the insulating resin, and a material having metal fiber mixed therein is used for the highly electroconductive resin. This resin body therefore does not have sufficient strength, and is not adoptable as a part which needs high strength.

SUMMARY OF THE INVENTION

The present invention has been made in view of this conventional inconvenience, and it is an object of the present invention to provide an electroconductive resin body that can have higher strength and that have electroconductivity and a vehicle grounding structure.

In order to achieve the above mentioned object, an electroconductive resin body according to one aspect of the present invention includes fiber-reinforced resin including resin and a plurality of fiber strings formed of at least one selected from carbon fiber, high-strength fiber and glass fiber, the resin impregnating between the fiber strings, wherein the fiber strings are metal-plated.

This electroconductive resin body includes fiber-reinforced resin including resin and a plurality of fiber strings formed of at least one selected from carbon fiber, high-strength fiber and glass fiber, the resin impregnating between the fiber strings, and has the fiber strings metal-plated. This electroconductive resin body can have higher strength imparted by the fiber-reinforced resin while having electroconductivity imparted by metal-plating. Consequently, an electroconductive resin body that can have higher strength and that have electroconductivity can be provided.

According to another aspect of the present invention, in the electroconductive resin body, it is preferable that the plurality of fiber strings are laminated in a plurality of layers each including at least two fiber strings, and of the plurality of fiber strings laminated in the layers, fiber strings in some of the layers are metal-plated, and fiber strings in the other ones of the layers are not metal-plated.

In this electroconductive resin body, because the fiber strings in some of the layers of the plurality of layers are metal-plated, the amount of metal-plating can be reduced in accordance with a necessary level of electroconductivity (a demanded level of resistance), which causes reduction in cost.

According to still another aspect of the present invention, in the electroconductive resin body, it is preferable that the plurality of fiber strings are arranged in parallel to one another along a predetermined direction, and of the plurality of fiber strings, some fiber strings arranged along the predetermined direction are metal-plated, and the other fiber strings are not metal-plated.

In this electroconductive resin body, because some of the fiber strings arranged along a predetermined direction are metal-plated, the amount of metal-plating can be reduced in accordance with a necessary level of electroconductivity (a demanded level of resistance), which causes reduction in cost.

According to still another aspect of the present invention, in the electroconductive resin body, it is preferable that the fiber strings are formed of carbon fiber, and have a surface oxygen content of not less than 0.097 and not more than 0.138, the surface oxygen content being a value obtained by dividing $O_{1S}$ peak intensity measured by X-ray photoelectron spectroscopy by $C_{1S}$ peak intensity measured by the same spectroscopy.

The inventors of the present invention have found out that plating deposition property and adhesion can be improved with a surface oxygen content of not less than 0.097 and not more than 0.138 because such a surface oxygen content improves wettability against metal-plating. Therefore, in this electroconductive resin body, the carbon fiber strings can have higher plating deposition property and higher adhesion by having a surface oxygen content in the above range. Moreover, because it is necessary only to bring the surface oxygen content into the above range, there is no need to use alkali, and reduction in mechanical strength can be avoided consequently.

According to still another aspect of the present invention, a vehicle grounding structure includes the electroconductive resin body as a vehicle body, wherein minus terminals of vehicle-mounted devices and of a vehicle battery are electrically connected to locations in the electroconductive resin body that have the metal-plated fiber strings arranged therein.

In the vehicle grounding structure, while the electroconductive resin body is used as the vehicle body, the minus terminals of the vehicle-mounted devices and of the vehicle battery are electrically connected to locations in the electroconductive resin body that have the metal-plated fiber strings arranged therein. This structure makes it possible to use the fiber-reinforced resin for the vehicle body, which needs strength, and to give a certain level of electroconductivity imparted by the metal-plated fiber strings. Consequently, a grounding structure can be constructed with the minus terminals of the vehicle-mounted devices and of the vehicle battery electrically connected to the metal-plated fiber strings.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The present invention is described below in accordance with a preferred embodiment. The present invention is not limited to the following embodiment and can be altered appropriately without departing from the spirit of the present invention. Although the following embodiment omits illustration and description of some of components, it goes without saying that publicly known or well-known techniques are applied appropriately to details of omitted techniques to the extent that there is no inconsistency with details described below.

Figure 1:
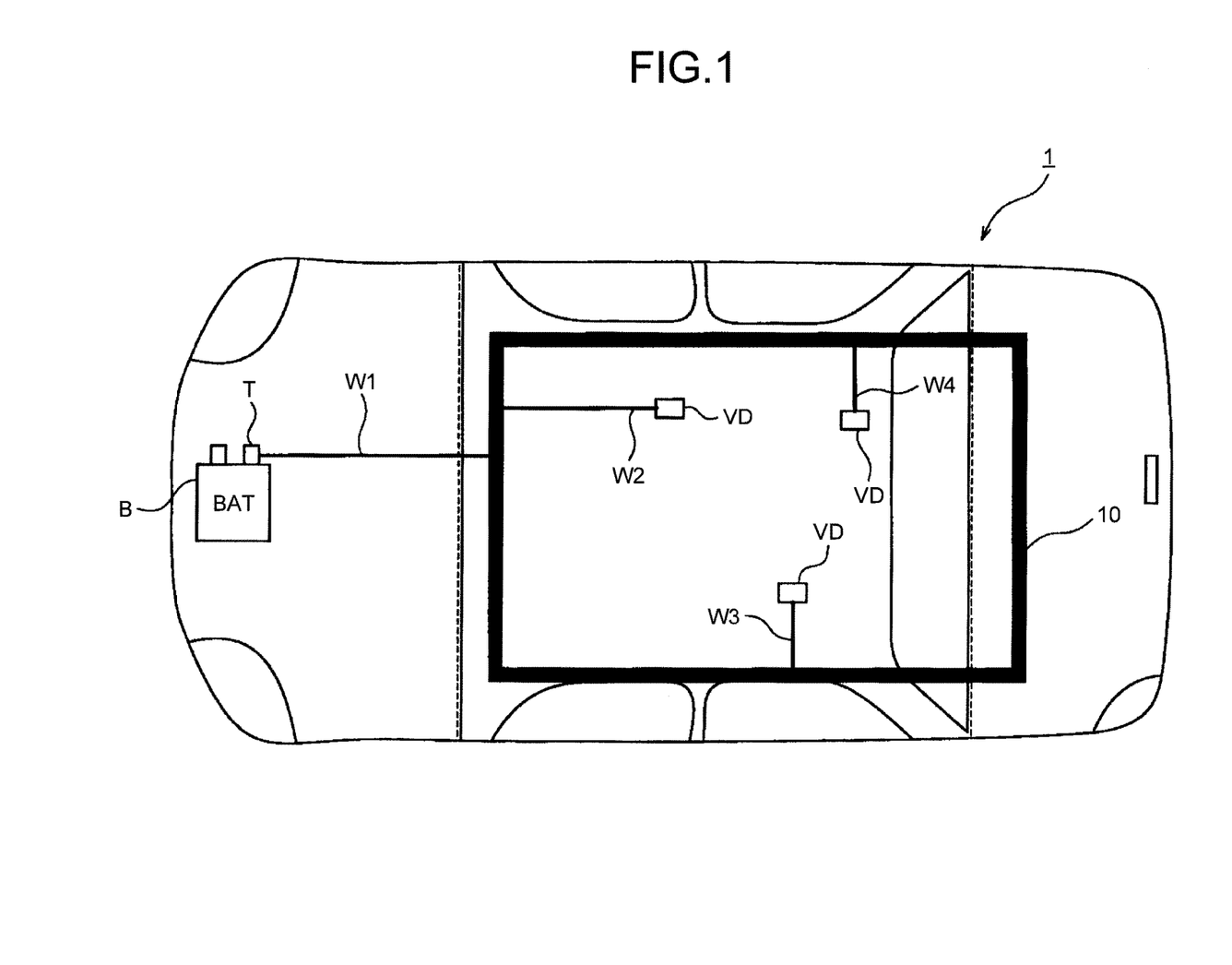
FIG. 1 is a top view of a vehicle, illustrating a vehicle grounding structure including an electroconductive resin body according to an embodiment of the present invention.

FIG. 1 is a top view of a vehicle, illustrating a vehicle grounding structure including an electroconductive resin body according to an embodiment of the present invention. As illustrated in FIG. 1, a vehicle grounding structure 1 is a structure for securing grounding lines between a vehicle battery (BAT) B installed in the vehicle and a plurality of vehicle-mounted devices VD, and includes an electroconductive resin body 10 and various electrical wires W1 to W4.

The electroconductive resin body 10 is formed of fiber-reinforced resin (what is called carbon fiber-reinforced plastic or fiber-reinforced plastic, for example) including resin and a plurality of fiber strings formed of at least one selected from carbon fiber, high-strength fiber and glass fiber, the resin impregnating between the fiber strings. The high-strength fiber herein includes aramid fiber, polyarylate fiber and PBO fiber. For example, epoxy resin is used as the resin (resin that serves as a base material) with which the spaces are impregnated.

The electroconductive resin body 10 in the embodiment is obtained by metal-plating (for example, plating with copper) the above fiber strings. By thus being metal-plated, the electroconductive resin body 10 has higher electroconductivity than normal fiber-reinforced resin. Furthermore, the electroconductive resin body 10 according to the embodiment is used as a vehicle body (for example, a vehicle frame).

A first electrical wire W1 is an electrical wire that electrically connects the minus terminal T of the vehicle battery B to the electroconductive resin body 10. The first electrical wire W1 may be connected directly to the minus terminal T of the vehicle battery B, or may be electrically connected to the minus terminal T of the vehicle battery B by way of another member. In addition, the first electrical wire W1 has, on one side thereof facing the electroconductive resin body 10, a connection terminal that can be, for example, fastened with a bolt. The first electrical wire W1 is electrically connected to the electroconductive resin body 10 by way of the connection terminal.

A second to a fourth electrical wires W2 to W4 are electrical wires that electrically connect the minus terminals of the vehicle-mounted devices VD to the electroconductive resin body 10. The second to the fourth electrical wires W2 to W4 may be connected directly to the minus terminals T of the vehicle-mounted devices VD, or may be electrically connected thereto by way of other members such as terminals. In addition, each of the second to the fourth electrical wires W2 to W4 has, on one side thereof facing the electroconductive resin body 10, a connection terminal that can be, for example, fastened with a bolt. The second to the fourth electrical wires W2 to W4 are electrically connected to the electroconductive resin body 10 by way of the connection terminals.

As long as the electrical wires W1 to W4 can electrically connect the minus terminal T of the vehicle battery B and the minus terminals of the vehicle-mounted devices VD to the electroconductive resin body 10, how these connections are implemented does not matter.

Figure 2A:
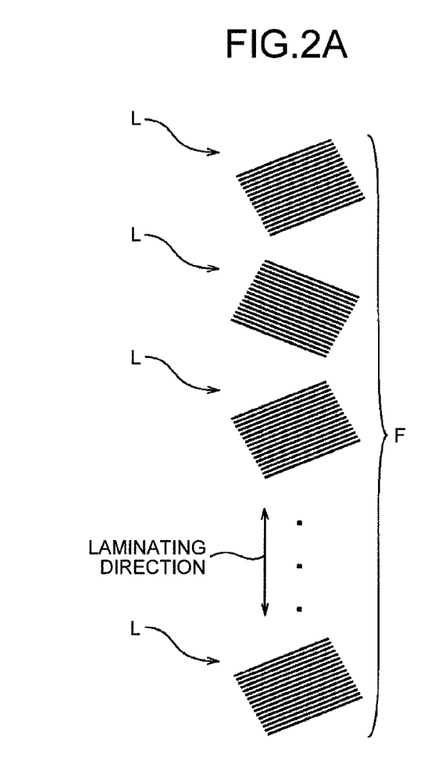
FIGS. 2A, 2B, and 2C are exploded perspective views schematically illustrating the electroconductive resin body illustrated in FIG. 1, and illustrate a first example, a second example, and a third example, respectively.
Figure 2B:
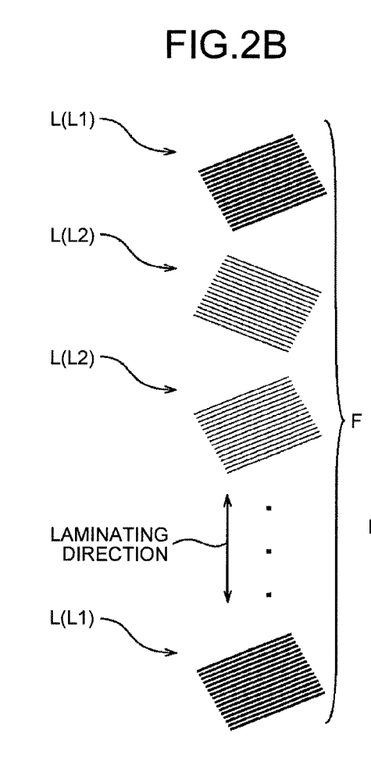
Figure 2C:
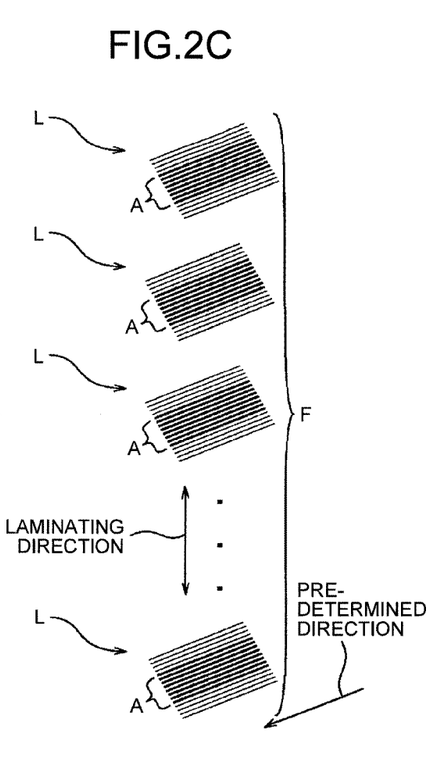

FIGS. 2A, 2B, and 2C are exploded perspective views schematically illustrating the electroconductive resin body illustrated in FIG. 1, and illustrate a first example, a second example, and a third example, respectively. In FIGS. 2A, 2B, and 2C, bold lines indicate metal-plated fiber strings, and thin lines indicate fiber strings that are not metal-plated.

First, as illustrated in each of FIG. 2A to FIG. 2C, in the electroconductive resin body 10, a plurality of fiber strings F are laminated in a plurality of layers L each having at least two fiber strings F. The electroconductive resin body 10 is produced by impregnating spaces between the thus laminated fiber strings F with resin, and press-molding these resin-impregnated fiber strings.

In the first example illustrated in FIG. 2A, all fiber strings F of the plurality of fiber strings F are metal-plated in the thus produced electroconductive resin body 10.

In the second example illustrated in FIG. 2B, of the plurality of fiber strings F, fiber strings F in some of the layers L are metal-plated, and fiber strings F in the other ones of the layers L are not metal-plated. In the second example, the layers L in which metal-plating has been applied are, for example, but are not limited to, two opposite outer layers L1, and may be one of the layers L1 or may be inner layers L2 only, which are the layers L other than the opposite outer layers L1.

Furthermore, in the third example illustrated in FIG. 2C, while the plurality of fiber strings F are arranged along a predetermined direction, some fiber strings (hereinafter first fiber strings) F thereof arranged along the predetermined direction are metal-plated, and the other fiber strings F, which are not the first fiber strings, are not metal-plated. The first fiber strings F are preferably, but not limited to, all of the fiber strings F that are within a region A (completely in the laminating direction) when the electroconductive resin body 10 is viewed in a planar fashion (in the laminating direction).

In the examples illustrated in FIGS. 2A, 2B, and 2C, having the fiber strings F laminated in a plurality of layers and having the fiber strings F arranged along a predetermined direction and side by side (arranged parallel to one another) are not requisite for the electroconductive resin body 10, and the fiber strings F may optionally be laminated in layers or arranged in parallel to one another in accordance with the purpose of use. Therefore, the electroconductive resin body 10 may be obtained by simply bundling a plurality of fiber strings F together, impregnating spaces between these fiber strings F with resin, and then press-molding these resin-impregnated fiber strings, or may be obtained by simply gathering a plurality of fiber strings F (which may include long fiber strings F and short fiber strings F) that are not bundled, impregnating these fiber strings with resin, and then press-molding these resin-impregnated fiber strings.

Furthermore, when the electroconductive resin body 10 illustrated in FIG. 2B is used in the vehicle grounding structure 1, it is preferable that the minus terminal T of the vehicle battery B and the minus terminals of the vehicle-mounted device VD be electrically connected to the electroconductive resin body 10, for example, in such a manner that a connection terminal such as a bolt is caused to penetrate through the electroconductive resin body 10 to make all of the layers L electrically connectable. In addition, when illustrated in FIG. 2C is used in the vehicle grounding structure, the minus terminal T of the vehicle battery and the minus terminals of the vehicle-mounted devices VD are electrically connected to the electroconductive resin body 10 by being electrically connected to some of the fiber strings F (first fiber strings F) therein.

As described above, the minus terminal T of the vehicle battery B and the minus terminals of the vehicle-mounted devices VD are electrically connected to locations in the electroconductive resin body 10 that have metal-plated fiber strings F arranged therein.

Furthermore, in the embodiment, carbon fiber is used for the fiber strings F. Carbon fiber has low wettability against copper, and provides low copper-plating deposition property and low adhesion even when being electroplated. For this reason, when plating carbon fiber with copper is desired in the embodiment, carbon fiber exposed to supercritical carbon dioxide is used, so that carbon fiber strings having surface oxygen contents different from those of conventional carbon fiber strings are plated with copper.

A surface oxygen content used in the embodiment is a value ($O_{1S}/C_{1S}$) obtained by dividing the $O_{1S}$ peak intensity measured by X-ray photoelectron spectroscopy by the $C_{1S}$ peak intensity measured by the same spectroscopy. When the surface of carbon fiber is more highly oxidized, the $O_{1S}$ peak intensity measured by X-ray photoelectron spectroscopy is higher, and the value of the surface oxygen content thereof tends to be higher.

It is known that the number of surface oxygen atoms and the number of acidic functional groups increase at substantially the same rates. In addition, it is considered that acidic functional groups contribute to interfacial bonding. The surface oxygen content of the carbon fiber according to the embodiment is not less than 0.097 and not more than 0.138. The carbon fiber having a surface oxygen content in the above range enables improvement in plating deposition property and in adhesion. When having a surface oxygen content of less than 0.097, carbon fiber tends to have extremely lower adhesion with copper than otherwise. In addition, carbon fiber having a surface oxygen content of more than 0.138 tends to provide inferior plating deposition property because surface oxygen on the carbon fiber disturbs contact thereof with a power feeding part for electroplating and this makes it difficult for current to flow through the carbon fiber.

Figure 3:
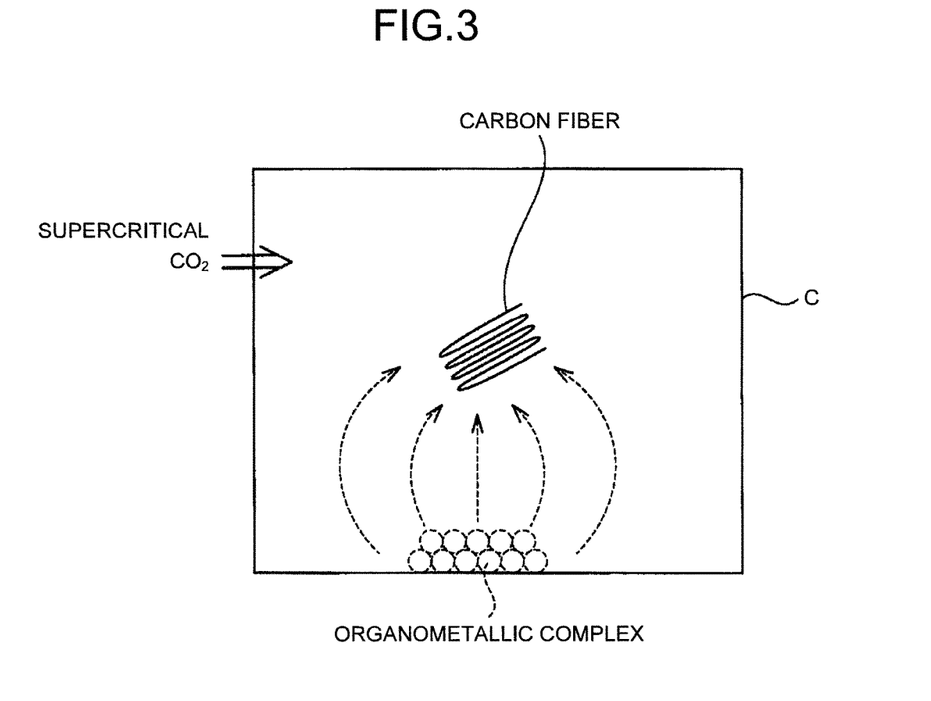
FIG. 3 is a schematic view for illustrating a method for plating carbon fiber.

Next described is a method for plating the carbon fiber. FIG. 3 is a schematic view for illustrating a method for plating the carbon fiber. Metal-plating the carbon fiber in the embodiment starts with placing the carbon fiber into the inside of a treatment tank C (the first step). In the embodiment, it is assumed that, at the first step, there is no organometallic complex placed into the inside of the treatment tank C. This is because certain levels of plating deposition property and adhesion can be obtained without having any organometallic complex placed into the inside of the treatment tank C.

Subsequently, carbon dioxide in supercritical state is supplied to the inside of the treatment tank C into which the carbon fiber has been placed (the second step). The carbon fiber is then taken out of the treatment tank C after a lapse of a predetermined time period starting from when supercritical carbon dioxide has been supplied (the third step). The aforementioned carbon fiber having a surface oxygen content of not less than 0.097 and not more than 0.138 can be obtained through the above steps.

Thereafter, what is called electroplating is performed, so that the carbon fiber is metal-plated (plated with copper) (the fourth step).

Thus exposing the carbon fiber to supercritical carbon dioxide can result in changing the surface oxygen content of the carbon fiber, and the surface oxygen content can be set to a value of not less than 0.097 and not more than 0.138. Note that, at the first step, there may be a organometallic complex placed into the inside of the treatment tank C.

Figure 4:
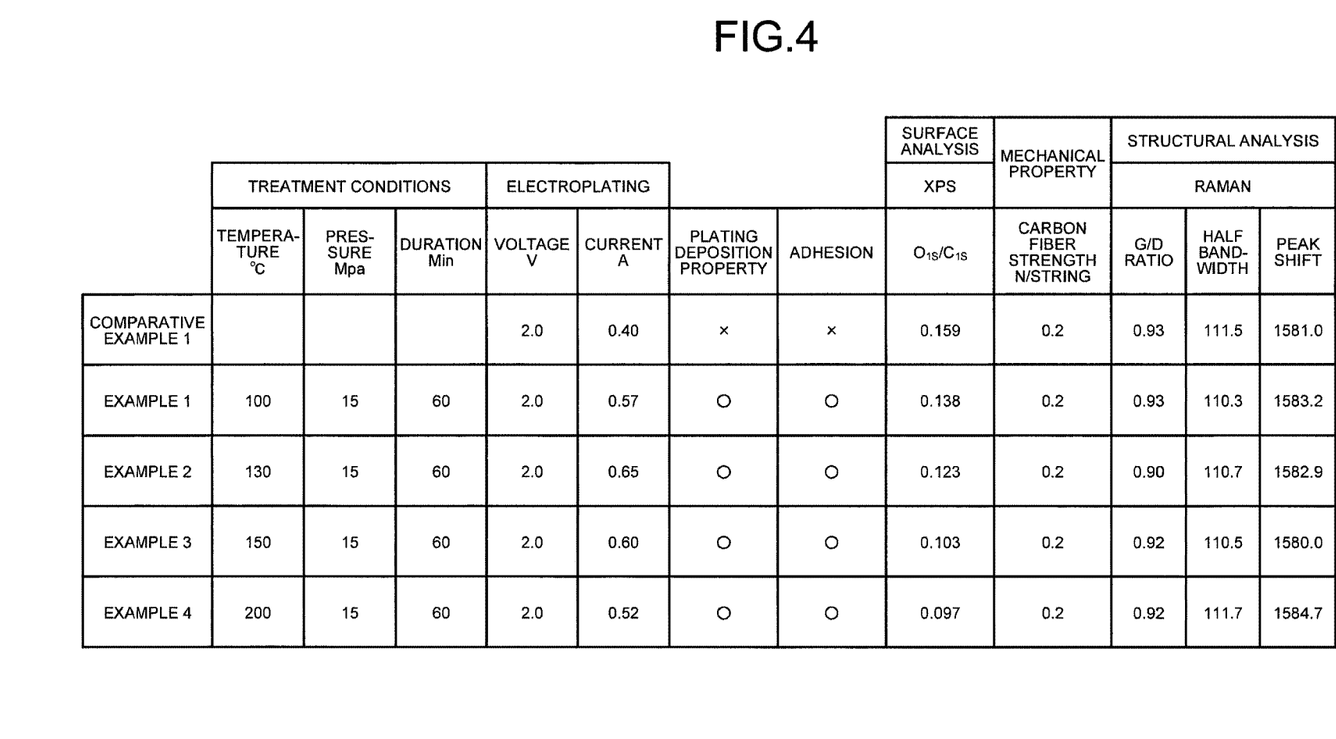
FIG. 4 is a table illustrating examples and a comparative example of metal-plated carbon fiber strings.

Next described are examples and a comparative example of metal-plated carbon fiber strings. FIG. 4 is a table illustrating examples and a comparative example of metal-plated carbon fiber strings. Polyacrylonitrile (PAN)-based fiber strings each having a diameter of 7 μm are used as the carbon fiber strings. For Example 1 illustrated in FIG. 4, supercritical condition of carbon dioxide was a condition under the pressure at 15 MPa and the temperature of 100° C.; and the treatment with supercritical carbon dioxide was performed for 60 minutes. In addition, for Example 2, supercritical condition of carbon dioxide was the pressure of 15 MPa and the temperature of 130° C.; and the treatment with supercritical carbon dioxide was performed for 60 minutes. Furthermore, for Example 3, supercritical condition of carbon dioxide was the pressure of 15 MPa and the temperature of 150° C.; and the treatment with supercritical carbon dioxide was performed for 60 minutes. For Example 4, supercritical condition of carbon dioxide was the pressure of 15 MPa and the temperature of 200° C.; and the treatment with supercritical carbon dioxide was performed for 60 minutes.

For Examples 1 to 4 subjected to the above supercritical treatments and Comparative Example 1 not subjected to any supercritical treatment, the carbon fiber strings were electroplated with copper.

In FIG. 4, for the plating deposition property, a circle indicates that an even and favorable result was obtained, and a cross mark indicates that an uneven and unfavorable result was obtained. For the adhesion, a circle indicates that plating did not come off during washing with water after plating, and a cross mark indicates that plating came off during washing with water after plating.

To begin with, the surface oxygen contents were 0.138 for Example 1, 0.123 for Example 2, 0.103 for Example 3, and 0.097 for Example 4. For all of Examples 1 to 4 as described here, the plating deposition property was indicated by circles, and the adhesion was also indicated by circles. In contrast, the surface oxygen content was 0.159 for Comparative Example 1. For Comparative Example 1 as described here, the plating deposition property was indicated by a cross mark, and the adhesion was also indicated by a cross mark. Note that, as illustrated in FIG. 4, voltages in electroplating were set to 2.0 V in Examples 1 to 4 and Comparative Example 1. Current values were 0.57 A for Example 1, 0.65 A for Example 2, 0.60 A for Example 3, 0.52 A for Example 4, and 0.40 A for Comparative Example 1.

Based on the above results, when being electroplated with copper, the carbon fiber strings having a surface oxygen content of not less than 0.097 and not more than 0.138 provided favorable results, and were found able to have higher plating deposition property and higher adhesion.

Furthermore, as illustrated in FIG. 4, the strength (N/string) of the carbon fiber strings according to Examples 1 to 4 and Comparative Example 1 was measured, and structural analyses based on Raman spectroscopy were made on these carbon fiber strings. Here, regarding the strength, results were obtained by performing tensile tests for a single fiber string that comply with Japanese Industrial Standard (JIS) R 7606 and measuring tensile strength when the string is broken. In addition, for the Raman spectroscopy, the carbon fiber strings were irradiated with laser of a wavelength of 532 nm in order to allow observation of Raman spectra thereof, and results obtained by measuring G/D ratios, half bandwidths, and peak shifts of the Raman spectra are provided in the table. The higher G/D ratio means higher crystallinity. The half bandwidth represents a value indicating crystalline perfection, and the peak shift represents strain in arrangement of atoms.

As illustrated in FIG. 4, the strength of the carbon fiber strings was 0.2 N/string for Examples 1 to 4 and Comparative Example 1. Thus, the same value was obtained for all of these examples, that is, no difference was found in mechanical strength among them.

Furthermore, for Examples 1 to 4 and Comparative Example 1, the G/D ratios were 0.90 to 0.93, the half bandwidths were 110.3 to 111.5, and the peak shifts were 1580 to 1584.7. That is, no differences were found also in the values for the G/D ratios, for the half bandwidths, and for the peak shifts.

As described above, neither structural change nor reduction in mechanical strength was observed in the carbon fiber strings with and without the supercritical treatments (that is, whether or not the surface oxygen content of the carbon fiber strings is not less than 0.097 and not more than 0.138).

Therefore, it was found that the carbon fiber strings in Examples 1 to 4 were able to improve plating deposition property and adhesion without reducing the mechanical strength thereof.

In the above described manner, the electroconductive resin body 10 according to the embodiment is formed of fiber-reinforced resin including resin and a plurality of fiber strings formed of at least one selected from carbon fiber, high-strength fiber and glass fiber, the resin impregnating between the fiber strings, and these fiber strings F are metal-plated. Therefore, while having electroconductivity imparted by metal-plating, the electroconductive resin body 10 can have higher strength imparted by the fiber-reinforced resin. Consequently, the electroconductive resin body 10 that can have higher strength and that has electroconductivity can be provided.

In the case where the fiber strings F in some of the layers L of the plurality of layers are metal-plated, the amount of metal-plating can be reduced in accordance with a necessary level of electroconductivity (a demanded level of resistance), which causes reduction in cost.

Furthermore, in the case where some of the fiber strings F arranged along a predetermined direction are metal-plated, the amount of metal-plating can be reduced in accordance with a necessary level of electroconductivity (a demanded level of resistance), which causes reduction in cost.

In addition, the inventors of the present invention have found out that plating deposition property and adhesion can be improved with a surface oxygen content of not less than 0.097 and not more than 0.138 because such a surface oxygen content improves wettability against metal-plating. Therefore, the plating deposition property and adhesion can be improved with the carbon fiber strings having a surface oxygen content in the above range. Moreover, because it is necessary only to bring the surface oxygen content into the above range, there is no need to use alkali, and reduction in mechanical strength can be avoided consequently.

Furthermore, in the vehicle grounding structure 1 according to the embodiment, while the electroconductive resin body 10 is used as the vehicle body, the minus terminals of the vehicle-mounted devices VD and the vehicle battery B are electrically connected to locations in the electroconductive resin body 10 that have the metal-plated fiber strings F arranged therein. This structure makes it possible to use the fiber-reinforced resin in a vehicle body, which needs strength, and to give a certain level of electroconductivity imparted by the metal-plated fiber strings. Consequently, a grounding structure can be constructed with the minus terminals of the vehicle-mounted devices VD and of the vehicle battery B electrically connected to the metal-plated fiber strings.

In addition, in the carbon-fiber plating method according to the embodiment, carbon fiber strings having a surface oxygen content as described above are produced in the first to the third steps, and thereafter, the carbon fiber strings are electroplated in the fourth step. In this manner, carbon fiber strings can be suitably metal-plated. Therefore, a plating method can be provided that enables improvement in plating deposition property and in adhesion and enables appropriate metal-plating, without reduction in mechanical strength.

Although the present invention has been described based on the embodiment, the present invention is not limited by the embodiment. Various changes may be made without departing from the spirit of the invention, and other publicly known or well-known techniques may be combined with the embodiment within a possible range.

For example, although the electroconductive resin body 10 is used as the vehicle grounding structure 1 in the above embodiment, this is not a limiting example. The electroconductive resin body 10 may be used for another purpose, such as shielding or electroconductive circuitry.

The present invention makes it possible to provide an electroconductive resin body that can have higher strength and that have electroconductivity and a vehicle grounding structure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electroconductive resin body comprising:
   fiber-reinforced resin including resin and a plurality of fiber strings formed of at least one selected from carbon fiber, aramid fiber, polyarylate fiber, PBO fiber, or glass fiber, the resin impregnating between the fiber strings,
   wherein the plurality of fiber strings are laminated in a plurality of layers each including at least two fiber strings,
   of the plurality of fiber strings laminated in the layers, each of the fiber strings in some of the layers are metal-plated and arranged in parallel to one another in a first predetermined direction, and each of the fiber strings in the other ones of the layers are arranged parallel to each other in a second predetermined direction that is different from the first predetermined direction, and
   the fiber strings are formed of carbon fiber, and have a surface oxygen content of not less than 0.097 and not more than 0.138, the surface oxygen content being a value obtained by dividing $O_{1s}$ peak intensity measured by X-ray photoelectron spectroscopy by $C_{1s}$ peak intensity measured by the same spectroscopy.

2. The electroconductive resin body according to claim 1, wherein
the fiber strings in the other ones of the layers are not metal-plated.

3. A vehicle grounding structure comprising:
the electroconductive resin body according to claim 2 used as a vehicle body, wherein
minus terminals of vehicle-mounted devices and of a vehicle battery are electrically connected to locations in the electroconductive resin body that have the metal-plated fiber strings arranged therein.

4. A vehicle grounding structure comprising:
the electroconductive resin body according to claim 1 used as a vehicle body, wherein
minus terminals of vehicle-mounted devices and of a vehicle battery are electrically connected to locations in the electroconductive resin body that have the metal-plated fiber strings arranged therein.

5. An electroconductive resin body comprising:
fiber-reinforced resin including resin and a plurality of fiber strings formed of at least one selected from carbon fiber, aramid fiber, polyarylate fiber, PBO fiber, or glass fiber, the resin impregnating between the fiber strings, wherein
the plurality of fiber strings are laminated in a plurality of layers each including at least two fiber strings,
the plurality of fiber strings are arranged in parallel to one another along a predetermined direction,
for each of the layers, some fiber strings arranged along the predetermined direction are metal-plated, and the other fiber strings are not metal-plated, and
the fiber strings are formed of carbon fiber, and have a surface oxygen content of not less than 0.097 and not more than 0.138, the surface oxygen content being a value obtained by dividing $O_{1s}$ peak intensity measured by X-ray photoelectron spectroscopy by $C_{1s}$ peak intensity measured by the same spectroscopy.

6. A vehicle grounding structure comprising:
the electroconductive resin body according to claim 5 used as a vehicle body, wherein
minus terminals of vehicle-mounted devices and of a vehicle battery are electrically connected to locations in the electroconductive resin body that have the metal-plated fiber strings arranged therein.

\* \* \* \* \*